Nov. 14, 1967  J. H. CRAWFORD ET AL  3,352,770
ELECTROCHEMICAL MACHINING OF SMALL DIAMETER
HOLES IN HIGH TEMPERATURE SUPERALLOYS
Filed Nov. 2, 1966  3 Sheets-Sheet 1
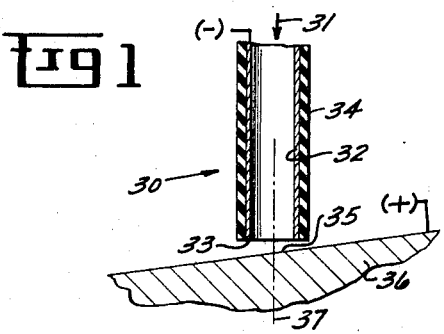
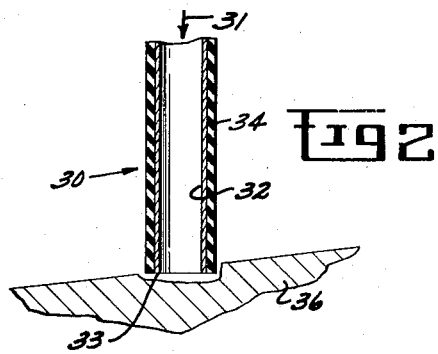
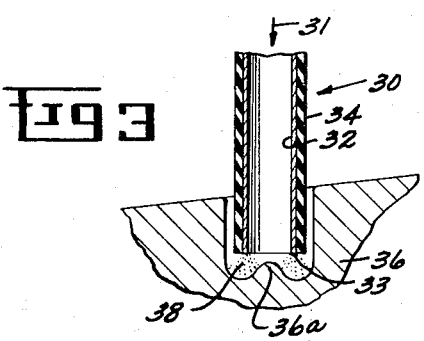
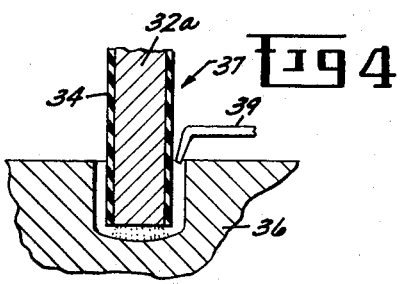
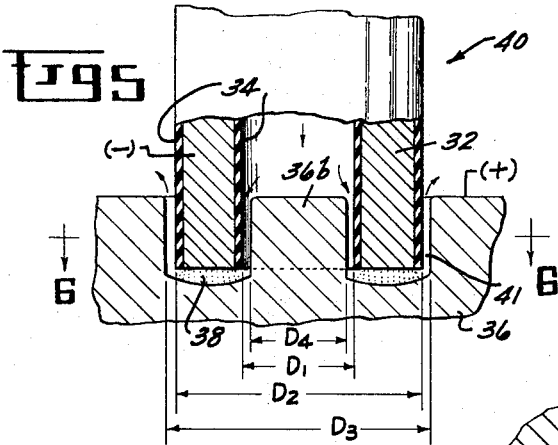
INVENTORS.
JOSEPH H. CRAWFORD
ROBERT D. HALVERSTADT
BY Lee H. Sachs
ATTORNEY Nov. 14, 1967  J. H. CRAWFORD ET AL  3,352,770
ELECTROCHEMICAL MACHINING OF SMALL DIAMETER
HOLES IN HIGH TEMPERATURE SUPERALLOYS
Filed Nov. 2, 1966  3 Sheets-Sheet 2
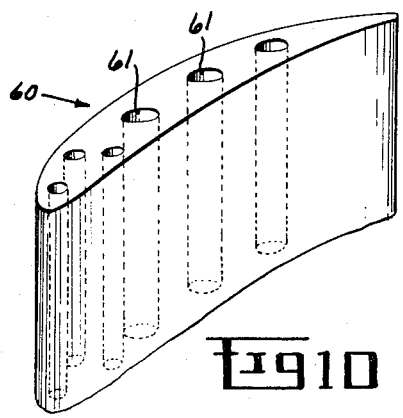
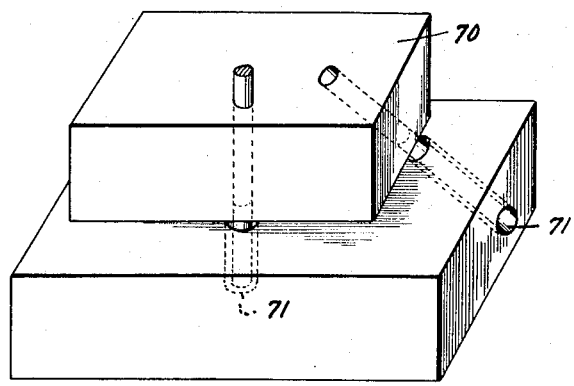
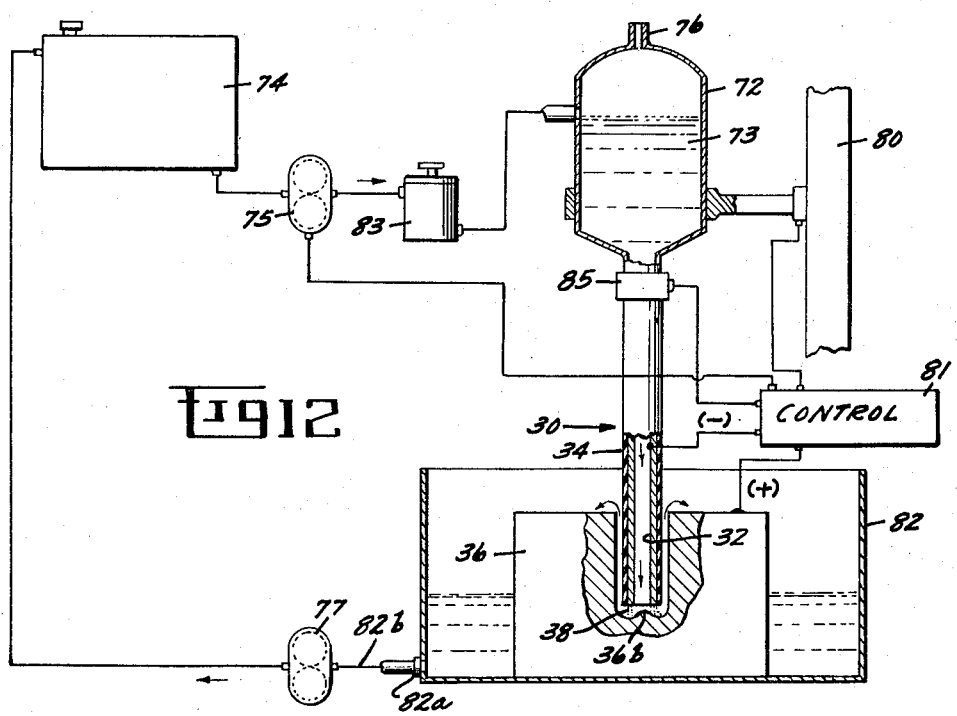
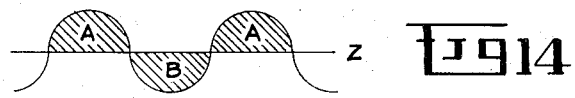
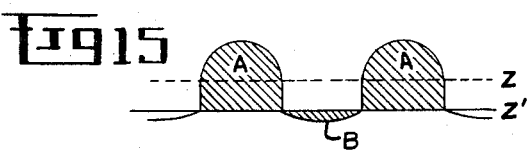
INVENTORS.
JOSEPH H. CRAWFORD
ROBERT D. HALVERSTADT
BY
Lee H. Sacks
ATTORNEY-

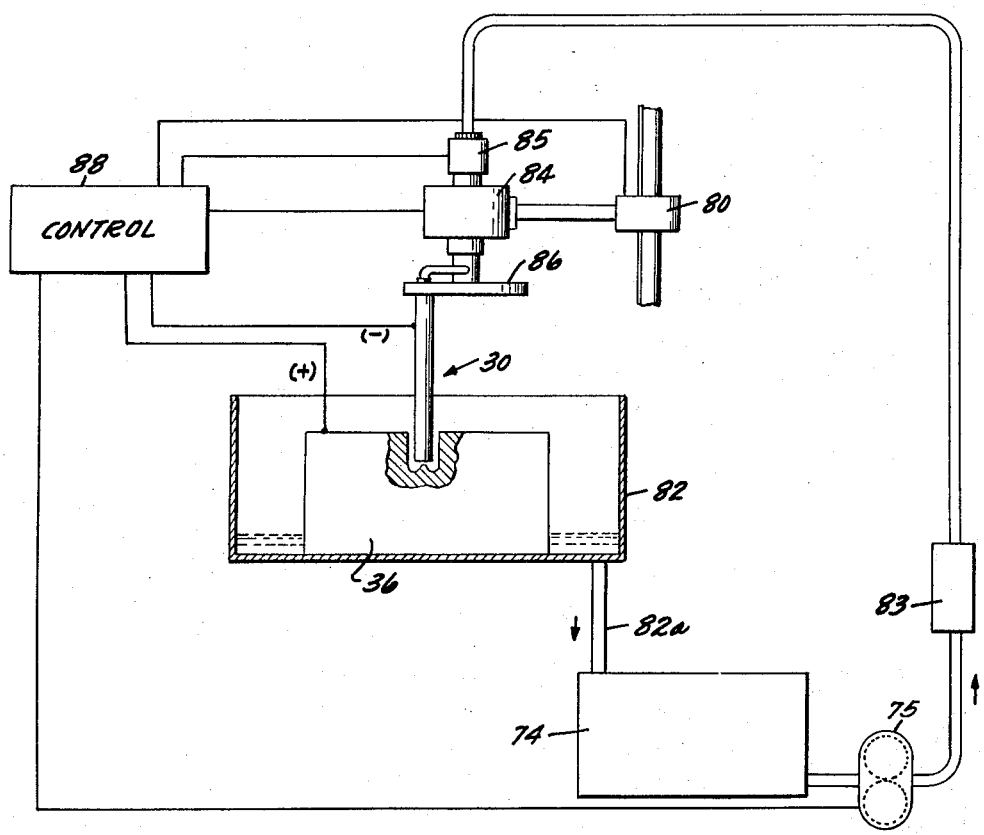

United States Patent Office 3,352,770
Patented Nov. 14, 1967

3,352,770
ELECTROCHEMICAL MACHINING OF SMALL DIAMETER HOLES IN HIGH TEMPERATURE SUPERALLOYS
Joseph H. Crawford, Cincinnati, Ohio, and Robert D. Halverstadt, New Canaan, Conn., assignors to General Electric Company, a corporation of New York
Filed Nov. 2, 1966, Ser. No. 623,147
3 Claims. (Cl. 204—143)

ABSTRACT OF THE DISCLOSURE

An electrolytic machining method for producing a small diameter cavity uses a small diameter dielectric coated hollow electrode, the uncoated open tip of which directs electrolyte across an operating gap toward a workpiece. The electrolyte flow capacity of the operating gap is controlled to provide unrestricted, low pressure, low velocity flow of electrolyte leaving the gap.

---

This is a continuation-in-part of application Ser. No. 327,578 filed Nov. 26, 1963, which was a continuation of application Ser. No. 823,975 filed June 30, 1959, for Electrolytic Conduction Method and Apparatus for Controlled Material Removal assigned to the same assignee as this invention both applications being now abandoned.

This invention relates to an electrolytic conduction method for the controlled removal of matter from a workpiece such as in the production of passages of regular or irregular shapes.

To keep pace with advancing technology especially in the field of propulsion, improved metallic materials have been developed, some of which are high temperature alloys sometimes called "superalloys." Some of such improved materials unfortunately are difficult to machine, drill, grind and otherwise shape into a useful configuration. Many of the usual mechanical means cannot shape these materials at all; others require excessive time to accomplish the processing and then, after processing, result in a stressed or distorted article which must be further treated before it is in a useful condition.

It is an object of the present invention to provide an electrolytic conduction type of method employing an electrode comprising an outer electrically non-conductive portion by means of which passages or channels having a very high length to diameter ratio may be generated of regular or irregular shape and surface contours without creating stresses in the material of the workpiece or distortion of its surface and at a rate which is practical for production.

It is another object of this invention to provide a method for accurately localizing the removal of material from a workpiece by means of electrolytic conduction including periodic reversal of current through controlled flow of electrolyte whereby passages or channels of regular or irregular shape may be accurately generated in or on a workpiece.

The basic rule of electrolytic material removal using electric current passing between two electrodes carrying opposite charges and suspended in a conducting fluid is known as one of Faraday's laws. It states that the quantities of substances set free at an electrode are directly proportional to the quantity of electricity which passes through the conducting fluid.

Faraday's law has been reduced to practice in electroplating processes to deposit a material from a conducting solution or "electrolyte" onto an electrode-workpiece as well as electropolishing or electrocleaning processes, sometimes referred to as "deplating," to remove material from an electrode-workpiece.

One problem which may arise in the material removing type of process when for example, it is used to produce a hole or form in an article, is difficulty in accurate focusing of the electrolytic forces acting to remove the workpiece material while maintaining a practical rate of material removal. Inaccurate focusing results in poor accuracy of hole geometry or form generation. A very important problem when producing small diameter holes or cavities using tubular electrodes through which electrolyte passes is avoidance of electrode deflection as a result of excessive electrolyte pressure and velocity and the control of fluid flow mechanics of the electrolyte as it emerges from between the electrode and workpiece. Improper control also can allow the electrolyte fluid to swirl around the end of the tube causing cavitation of the tube and resulting in irregular hole or cavity generation. Other problems include preventing corrosive attack on the electrode and obtaining a satisfactory surface finish.

In carrying out one form of our invention, we adjust and schedule the feed rate and directional movement of a coated electrode, we control the flow and turbulence of the electrolyte and schedule the electrical current passing from the electrode to the workpiece. We include provisions for periodic reversal of current either by reversing direct current flow or by employing an alternating current flow. Thus, material can be removed at a more rapid and more uniform rate through increased feed rate of the electrode to result in a surface less subject to preferential etching. By coating the electrode, we focus the material-removing electrolytic forces thereby enabling us to produce a passage, channel, hole, surface, etc. of very great depth in relation to its diameter and of any desired configuration or shape, regular or irregular, with negligible electrical, chemical or electrochemical attack on the material of the electrode or the workpiece.

Our invention is particularly directed to small diameter coated hollow electrodes, such as in the form of tubes, of 0.02–0.3″ in cross-sectional diameter. The method further requires control of the fluid dynamics of the system to provide uniform cavities and to avoid preferential etching of the workpiece material and cavitation of the electrode at its tip from which electrolyte is directed toward the workpiece. Such control is achieved by specifying that electrolyte flowing from the tip of the electrode be unrestricted in its flow out through the cavity created. Although this is a volume relationship, another way of stating this characterstic involves comparison of the cross-sectional area defined by the gap between the workpiece and the electrode with the cross-sectional area of the space between the inner wall of the cavity produced and the outer wall of the electrode. The method of this invention specifies close control can be obtained when the electrolyte flow capacity through the gap and into the cavity produced be equal to or less than the flow capacity of the space between the electrode and the cavity wall when the power input, feed rate and electrolyte pressure are defined by the limits, respectively, of 0.8–5 amps, 4–13 volts, 1–6″ per hour and 5–35 p.s.i.g. This control will eliminate preferential attack on certain elements of the workpiece material and will guarantee a desired surface finish on a preselected shape, passage or hole.

In one specific form of our invention, an aqueous electrolyte based on sulfuric acid, is passed through an electrically charged, hollow, shaped electrode including an exterior covering of a non-conductive or dielectric material, then against a workpiece carrying a charge opposite from that of the electrode. Although the electrical current density, generally measured in amperes per square inch of area, is an important factor in determining the amount of material removed from the workpiece, as was stated before, we choose to control the amount and quality of material removal by moving our coated electrode toward the workpiece or in to the cavity created at a rate which maintains the ratio of the cross-sectional area defined by the gap between the limits of the electrode tip and the workpiece to the annular cross-sectional area outside of the electrode and within the passage in the range of 1 or less. In this manner, at electrode pressures of 35 p.s.i.g. or below, high electrolyte velocities are avoided through such gap. Turbulence in the flow of the electrolyte through the electrode and into the cavity is reduced or confined to the area immediately at the end of the electrode where the current density is greatest and where material removal is occurring. All of this avoids bending of the electrode and cavitation at the tip of the electrode as well as preferential etching of the workpiece. The result is uniform holes, one to another each with a more smoothly, accurately finished surface.

Curved internal passages or complex cavities can be produced by rotating the workpiece or coated electrodes, using coated electrodes comprising concentric tubes or rods, guiding the electrode through a desired path, or using flexible electrodes. Tubular coated electrodes which have been bundled together or grouped in a solid matrix, the ends of which have been arranged to form a contour or shape, or a shaped porous material through which electrolyte passes, can be used to produce a contoured or shaped article as the electrode approaches the workpiece and as the electrical current and electrolyte pass between the electrode and the workpiece.

The method characterizing the present invention provides great flexibility in manufacturing operations in which complex shaped parts must be produced from cast or forged blanks. Deep, thin, regular or irregular holes, channels or passages can be produced in difficult-to-work metals. We have found that in the practice of our method and by the use of our apparatus, forms and cavities may be produced without need of additional treatment such as for the relief of stresses or surface distortions developed through other methods.

In referring to hollow or tubular electrodes, we use that term and drawings relating thereto in the generic sense to include hollow annular, rectangular and irregularly shaped flexible or rigid hollow or porous members through which electrolyte may pass for subsequent contact with a workpiece.

The subject matter which we regard as our invention is particularly pointed out and distinctly claimed in the concluding portion of this specification. Our invention, however, both as to organization and method of operation, together with further objects and advantages thereof, may best be understood by reference to our description taken in conjunction with the accompanying drawings in which:

FIG. 1 is an enlarged fragmentary sectional view of the electrode and workpiece prior to start of processing;

FIG. 2 is an enlarged fragmentary sectional view of the electrode and workpiece just after material removal has begun;

FIG. 3 is an enlarged fragmentary sectional view of the electrode penetrating the workpiece;

FIG. 4 is an enlarged fragmentary sectional view of a coated solid electrode in the process of material removal from a workpiece;

FIG. 5 is an enlarged fragmentary sectional view of an inside and outside coated electrode in operation;

FIG. 6 is a cross-sectional view taken along line 6—6 of FIG. 5;

FIGS. 7, 8 and 9 are enlarged fragmentary sectional views of equivalent electrodes and including various diameter designations;

FIG. 10 is a fragmentary view of a portion of a gas turbine blading member including passage for cooling fluid;

FIG. 11 is a perspective view of an electrode guide piece;

FIGS. 12 and 13 are diagrammatic side views of embodiments of our material removing apparatus;

FIG. 14 is a diagram of a standard alternating current sine wave; and

FIG. 15 is a diagram of a biased alternating current sine wave.

This invention is particularly concerned with the rapid and accurate formation of passages or forms of regular or irregular shape having a very high length to diameter ratio heretofore unobtainable by other electrolytic conduction methods or physical methods such as drilling, boring, etc. for material removal especially when working with "superalloys," particularly those based on Fe, Ni and Co. In order to obtain passages such as shown in FIGS. 3, 4, 5 or groups of passages in FIGS. 10 and 11, we prefer to employ as an electrode a coated tube shown generally at 30 comprising an electrical conducting hollow tube 32, FIGS. 1–3, coated with an electrical insulating coating 34. The tube 32 is hollow to accommodate the flow of electrolyte through the tube toward workpiece 36 as shown by arrows 31 in FIGS. 1–3. The material of the conducting portion of the coated electrode may be any electrical conducting material but, as will later be described in connection with specific examples, it is preferably made of a metal or metal alloy which does not react with the electrolyte to be passed through the tube.

Now referring to FIGS. 1–3, our coated tube 30 is first located opposite the surface 35 to be processed and in alignment with the initial desired direction of stock removal as shown by line 37 in FIG. 1. In one embodiment, workpiece 36 carries a positive direct current charge while tube 32 carries a negative direct current charge for example as from the poles of a direct current power generator. As will be described later in connection with FIGS. 14 and 15, a shifted or biased alternating current system of material removal may be used.

As electrolyte flows at the end 33 of tube 32, down through the tube as in FIGS. 1–3, it carries a negative electrical charge or iron toward the positive workpiece 36. Upon contact with the positively charged surface 35 of the workpiece, the negative ion is neutralized and a minute portion of the material of the workpiece thus is loosened. Part of such loosened material forms a true chemical solution with the electrolyte. Part forms an insoluble sludge which may be carried by the electrolyte to a filter thus being removed from the system but generally is accumulated partly on the surface of the workpiece and partly on the end 33 and inside surface of tube 32. We have determined that there is a direct transfer of metal from the anodic workpiece 36 to the cathodic tube 32 which accentuates sludge formation. In addition there may be a redeposition or "plating out" on the internal diameter of the tube 32 of dissolved material from the recirculated electrolyte thus inhibiting the free and uniform flow of electrolyte. The sludge or removed material if allowed to build up will block the flow of electrolyte through the tube reducing efficiency of the operation eventually to the point where no material removal can occur. In addition, since the sludge is itself electrically conductive, it will cause the generation of an irregular shape or surface opposite the area of accumulation. As will later be described, a brief period of current reversal either by reversing direct current flow or by using an alternating current source combined with our process frees from the work and tube surfaces any sludge or accumulation of removed material thereby to allow such sludge to be removed by the flow of electrolyte.

Our periodic reversal feature becomes increasingly important as the depth of passage increases especially in passages of small cross-sectional area. We have found important the relationship of the inside area of the tube carrying the electrolyte to the workpiece and the area of the passage between the outside diameter of the tube and the inside diameter of the passage being produced through which the electrolyte passes away from the workpiece.

These areas along with the gap between the tip or end 33 of tube 30 and workpiece 36 help define the fluid mechanics, including the flow capacities of the system.

Once a sufficient depression is produced in the workpiece, the tube is moved toward the workpiece and the electrolyte continues to flow up and around the outside surface of the tube 30, FIG. 3, and away from the surface being worked carrying with it material loosened by the flow of the electrolyte and by the periodic reversal of electric current.

A typical ion path is represented by broken lines 38 in FIG. 3. When an electrical conducting hollow tube such as is shown by tube 30, is used for the convenience of carrying electrolyte to the area being worked, a raised portion or mound 36a of workpiece 36 is formed. The shape of the portion 36a depends on the shape of the end of the tube 32 as well as on rate of flow, rate of feed and current density. Nevertheless as the tube is moved deeper into the cavity, mound 36a is reduced proportionally with the rest of the workpiece. Thus the coating of our electrode tube serves to focus and concentrate ion paths 38 allowing accurate dimensional control of material removal and production of very high current densities thus to achieve rapid and efficient material removal.

The ability of the ion paths 38 to concentrate at the end of the tube thereby allowing the formation of mound 36a and reducing the total amount of material to be removed, can be utilized to a greater extent by coating the inside as well as the outside of the tube 32. Thus, as will be discussed later in connection with FIGS. 5 and 6, narrow yet deep annular passages heretofore difficult to produce may be easily and accurately created.

As has been previously stated, the coating of our tubes 32 to produce and focus high current densities on a restricted workpiece area, the periodic reversal of current and the control of flow of electrolyte toward and away from the workpiece through electrode feed rate control combine to produce continuously, at a heretofore unachievable rate and depth, accurate passages having a very great length compared with their diameter.

We have found that the annular passages 41, FIGS. 5 and 6, may be accurately produced in a workpiece using a tube coated both inside and out with a non-conductive coating 34. Thus the ion paths 38, FIG. 5, are concentrated on a narrower area leaving a projection 36b through the hollow area of the tube. The size of the projection depends on the diameter of the tube, the rate at which the tube is fed into the workpiece, the current density and the type and flow rate of electrolyte used.

However, without our periodic reversal of current or control of the electrolyte flow to and from the area being worked along with adjusting feed rate, removal of material would be greatly inhibited or possibly stopped. Irregular removal would occur partially at the bottom of the cavity and partially at the side of the tube, destroying dimensional accuracy.

Because of the electrical resistant coating on the outside of the tube, no electrolytic conduction type of removal can occur except generally at the end of the tube. Therefore control of fluid dynamics at the end or tip of the tube where work is being done has been found to be very important. The use of high electrolyte pressures, such as 50 p.s.i.g. or above, with relatively small hollow electrodes having an overall diameter of up to 0.3″ has been found to very detrimental to the method of this invention.

The present invention recognizes the importance of maintaining uninhibited flow of electrolyte from the end of the electrode into the cavity or hole being produced. Thus the method specifies that the electrolyte flow capacity through the gap between the tip of the electrode and into the cavity produced be no greater than equal to the electrolyte flow capacity of the space between the walls of the cavity and the outer surface of the electrode. With this arrangement, the constricting orifice in the fluid system lies in such gap and not within the space between the electrode and cavity wall. With pressures such as 50 p.s.i.g. or above, electrolyte issuing from such gap is in turbulent flow to the extent that it causes cavitation of the outer surface of the elecrode. This results in damage to the electrode coating and to the electrode surface itself causing irregular cavity or hole formation.

Although control of flow through the gap between electrode and workpiece is the most positive approach, another approach to assure unrestricted flow of electrolyte from the gap into the space between the cavity wall and the electrode is to adjust the flow capacity of the cavity generated with respect to the size of the hollow portion of the electrode. In this approach, we have found that the inlet area, $A_T$, defined as the cross-sectional area of the hollow portion of the tube at the end adjacent the surface of the workpiece from which material is being removed is controlled to be less than or equal to $A_P$ which is the cross-sectional area of the space between the outer surface of the tube and the walls of the passage created taken at the end of the tube near the workpiece from which material is being removed. For example, referring to FIG. 7, for an electrode 50 including a conductive portion 52 on the inside of the non-conducting tube 53

$$A_T = \pi \left(\frac{D_1}{2}\right)^2$$

and $$A_P = \frac{\pi}{4}(D_3^2 - D_2^2)$$

As in FIG. 5, for an electrode 40 including a non-conductive portion both on the inside and the outside but not on the end $$A_T = \frac{\pi}{4}(D_1^2 - D_4^2)$$

and $$A_P = \frac{\pi}{4}(D_3^2 - D_2^2)$$

Expressing the relationship algebraically $$\frac{A_T}{A_P} \leq 1$$

Although we have been referring to conductive tubes to which have been added a non-conductive portion such as a coating, we have found that a conductive portion such as 52, FIG. 7, some examples of which are silver, platinum or gold, deposited by any known deposition or attached as by vapor means on the inside of a non-conductive tube 53 which might be of ceramic, plastic, wood, rubber, etc., as well as an electrode wire 52a, FIG. 9, extending to the end of a non-conductive tube 53 will perform well as an electrode in our method.

The production of deep very narrow holes in a workpiece permits the manufacture of articles such as a longitudinally perforated airfoil member 60 of FIG. 10, such as a blade, bucket, vane or strut, the channels 61 of which are used to allow passage of cooling fluid when such member is used in apparatus such as turbines capable of elevated temperature operation. Through the use of our above-described method with suitable electrode guidance as through a fixture 70, FIG. 11, to guide the electrodes toward the workpiece, a number of essentially parallel passages such as 61 in FIG. 10 or non-parallel passages 71, FIG. 11, may be accurately produced in a workpiece. For example, we have produced a series of .030 inch diameter passages with .005 inch thick walls between them, 8 inches long.

As we have stated, major factors which affect the amount of material removed from a workpiece include size and shape of electrode, feed rate of the electrode toward the workpiece, type and flow rate of the electrolyte, current density impressed on the working surface of the electrode, type of material of the workpiece, etc. Our method and apparatus may be used with any current density below that at which shorting occurs between electrodes. In a series of examples, the materials of the workpiece were nickel base superalloys having the compositions shown in the following Table I.

TABLE I.—WEIGHT PERCENT—BALANCE Ni AND IMPURITIES

|  | Alloy A | Alloy B | Alloy C |
| --- | --- | --- | --- |
| C | [1] 0.1 | 0.05 | 0.18 |
| Cr | 15 | 15 | 9.5 |
| Ti | 3.25 | 3.5 | 4.25 |
| Al | 4.25 | 4.5 | 5.5 |
| B | 0.03 | 0.08 | 0.02 |
| Co | 18.5 | | 15 |
| Mo | 5 | 5 | 3 |
| Fe | | 5 | |
| Zr | | | 0.06 |
| V | | | 0.9 |

[1] Max.

The electrode used was a titanium alloy tube coated on the outside only with a dielectric coating such as polyethylene. The electrolyte was an 11–16% sulfuric acid aqueous solution. The following Tables II and III give a portion of the various data accumulated for the production of various size holes in the nickel base alloy indicated:

TABLE II.—OPERATING CONDITIONS

| Example | Alloy | Feed, In./hr. | Electrolyte Pressure, p.s.i.g. | Volts | Amps | Reversal Cycle (sec.) | | Max. Gap., In. |
| --- | --- | --- | --- | --- | --- | --- | --- | --- |
| | | | | | | Rev. | On | |
| 1 | A | 6 | 27 | 13 | 1.7 | .21 | 4 | .004 |
| 2 | A | 3 | 34 | 10 | 1.5 | .25 | 5 | .007 |
| 3 | A | 3 | 26 | 8 | 5 | .25 | 5 | .006 |
| 4 | B | 1 | 5 | 5.5 | 3.6 | .5 | 11.5 | .007 |
| 5 | A | 1.5 | 21 | 4.5 | 0.85 | .42 | 7.8 | .003 |
| 6 | C | 3 | 28 | 10 | 2.0 | .21 | 5 | .0015 |

TABLE III.—Ti TUBE ELECTRODE AND HOLE SIZE
[Data in inches]

| Example | Tube Uncoated | | Coating Thickness | Coated Tube O.D. | Hole Diameter |
| --- | --- | --- | --- | --- | --- |
| | I.D. | O.D. | | | |
| 1 | .023 | .035 | .002 | .039 | .047 |
| 2 | .023 | .035 | .002 | .039 | .052 |
| 3 | .040 | .060 | .004 | .068 | .080 |
| 4 | .232 | .250 | .003 | .256 | .270 |
| 5 | .010 | .020 | .002 | .024 | .030 |
| 6 | .029 | .035 | .002 | .039 | .042 |

As shown by the above Tables II and III, significantly high feed rates in ranges up to 6 inches per hour or more can be achieved by varying conditions of power input and electrolyte flow characteristics depending on the dimensions of the electrode used. Limiting factors on the extent to which power input can be increased to increase material removal include heat generated sufficient to boil or dissociate the electrolyte and the point at which electrical arcing occurs either because of high power input or because there is insufficient electrolyte flow to remove sludges. If such sludges are accumulated, they can form an electrical bridge by narrowing the space between the electrode and the workpiece.

As noted in connection with Tables II and III, relatively low electrolyte pressures are required to avoid the turbulence and cavitation problems discussed above. It has been found that when cavitation does occur as a result of higher electrolyte pressures and the discharge of electrolyte from the constricting orifice at the working gap, deposits tend to form on the outer walls of the electrode adjacent the tip. This results in the production of an irregular and uneven hole and subsequently electrical shorting between the workpiece and the electrode. In addition, high electrolyte pressures place an unusually great strain or back pressure on the electrode causing it to bend and distort. Thus pressures such as 50 p.s.i.g. and above must be avoided.

It is preferred to operate at an electrolyte pressure as low as possible to maintain uniform material removal yet with sufficient flow to carry away sludge. This critical range of pressure has been found to lie within 5–35 p.s.i.g. Some operating data for this range is shown in the above Tables II and III for various tube sizes, feed rates, power inputs and the like.

As shown particularly in Table II, we prefer to use a current variation or reversal cycle. This removes sludge which might accumulate on the electrode tip during operation.

Although feed rates of less than about 1 inch per hour can be used, the method of the present invention does not contemplate such a low rate of material removal. Photomicrographic studies of Ni base superalloys of the type used in the above examples, has shown that preferential etching of the metal occurs at such low metal removal rates. The preferential attack occurs with dendritic segregation and not on the grain boundaries. A better surface finish occurs when the higher power settings and feed rates are used to allow a progress of at least 1 inch per hour. When the electric field is present for the longer periods of time which exist with slower material removal, more of the preferential etching phenomenon occurs. Thus practice of the method of the present invention requires feed rates of at least about 1 inch per hour.

In one form of our invention, FIG. 12, an electrically conducting tube 32 coated with an electrically non-conductive coating 34 which might be a plastic such as polyethylene, polytetrafluoroethylene, a ceramic, a rubber, etc. is joined through flow control means 85 with a reservoir 72 for the reception of electrolyte 73 as from a supply tank 74 and pump 75.

Although it is not always required, FIG. 13, reservoir 72 in FIG. 12 may include an exhaust opening or pipe 76 to permit the escape of gases formed by the electrolyte in its reaction with workpiece 36. Arm 80 of conventional motion apparatus such as a drill press, is connected with reservoir 72 and allows the reservoir and its attached electrode 30 to be moved in any desired direction. The rate and schedule for such movement may be controlled by standard timing and scheduling unit 81 which also controls the electrical current to and from the tube and workpiece and rate of electrolyte flow through pumping means such as pumps 75 and 77. Control 81 therefore maintains the ratio of $A_T$ to $A_P$ and also includes means for the previously described periodic reversal of current. Workpiece 36 may be located in a container 82 suitable for the collection of electrolyte flowing from the tube. Container 82 has an outlet such as at 82a to a conduit 82b and a pump 77 to carry electrolyte back to the supply tank 74. Residue and aforementioned sludge carried with the electrolyte back to the supply tank may partly settle to the bottom of that tank. That undesirable material remaining in suspension is then removed from the electrolyte by filter 83. With the tube and workpieces in the relative positions shown in FIG. 1, the control is activated thereby starting operation of the method previously described in connection with FIGS. 1–3. In FIG. 12, typical ion paths are shown by broken lines 38 and previously described mound 36a appears in the workpiece. By scheduling the rate of movement of arm 80 and hence tube 30, irregularly shaped passages may be created.

Another form of our invention, FIG. 13, provides for multi-directional movement of the electrode and eliminates the need for reservoir 72 and pump 77. Elements similar to those of the apparatus of FIG. 12 are used. Electrolyte from supply tank 74 is fed by a means such as pump 75 through filter 83 to a means for rotating the electrode such as a hollow shaft motor 84. The electrolyte then passes to flow valve 85 and then through a cam or guide means 86 to electrode 30. Guide means 86 gives generally horizontal direction and guidance to the electrode to enable the formation of complex channels or depressions in workpiece 36. The electrode is given additional movement by means of arm 80 of conventional motion apparatus. The rate and schedule of movements are coordinated and controlled by a standard timing and scheduling unit 88 which, in addition, controls the flow of electrical current between the tube and workpiece as well as the rate of electrolyte flow by pumping means 75 and flow valve 85.

Workpiece 36 may be located in a container 82 adapted to receive electrolyte overflow and pass it as by gravity to supply tank 74 for recirculation through the system.

As we have discussed above, our solution to the inherent problem of sludge accumulation comprising principally metal-complex particles at the site of the material removal, involved including in our cycle an automatic periodic reversal of current. Once loosened from the working area by this reverse of polarity, the sludge may be washed away by the electrolyte, later to be filtered out of the system such as by filter 83, FIGS. 12 and 13. When we use direct current in our system, the scheduling and timing of components such as cams, micro-switches, relays and thermal timers such as in control 81, FIG. 12 or control 88, FIG. 13 accomplishes any desired schedule of current reversal.

We have determined, however, that higher frequency of cycling or current reversal up to and including ultrasonics greatly improves rate of material removal from the work surface as well as its smoothness and accuracy of geometry. Although direct current used in our method and apparatus results in heretofore unachievable rates and quality of stock removal, biased or shifted alternating current still further improves such factors, thus to improve the accuracy of our method.

Referring to FIG. 14, an unbiased or unshifted alternating current would have just as much energy for metal removal as for cleaning or sludge removal. This is shown when areas A and B are equal. Since it is our aim to expend the larger part available energy on metal removal, we shift the zero reference line Z, FIG. 14, to a new position $Z^1$, FIG. 15, such as through the use of an electronic "square wave" generator or rectifiers with selective control. Thus in FIG. 15, the area A representing the electric current available for stock removal is much larger than area B representing electric current available for cleaning or sludge removal. By increasing or decreasing the bias or zero shift, we can control quite closely the percentage of our available energy for material and for sludge removal. A more constant rate of material removal results from this use of alternating current since the build-up of sludge, the removal of which becomes increasingly difficult with thickness built up, is not given a chance to form.

In addition, we have found that using alternating current rather than direct current to remove a given amount of material in a given amount of time, a lower current level is required. With an alternating current metal removal system, we can produce superior finishes and more complex geometries of workpieces. As was stated before, cumbersome mechanical parts of the direct current metal removal system may be dispensed with: motors, cams, timers and reversing relays are unnecessary when using an alternating current system. Although electrode tube and coating life is relatively long in our direct current system, the use of an alternating current increases such life still further. With the alternating current system, as with the direct current system, we prefer the reverse current portion at a lower current value than the metal removal or forward current settings for increased tube life although the same current level has definite advantages.

The alternating current for our alternating current type of system may be produced mechanically or electronically. Standard 60 cycle current may be used as alternators of other frequency. As we have mentioned, an electronic "square wave" generator may also be used. Any wave form may be used; it is only necessary that the plus and the minus wave form of the alternating current be capable of amplitude and duration control.

With the above understanding of the operations by means of which the present invention may be practiced, those skilled in the art will understand how to adapt existing machines or to build other machines to carry out the method aspects of the present invention.

What is claimed is:

1. An electrolytic material removal method for producing a small diameter cavity in a metallic workpiece selected from the group consisting of high temperature superalloys based on the elements Fe, Ni or Co, the steps of:

placing in spaced relationship with a surface of the workpiece a hollow electrode having
  (a) an outer lateral surface coated with a dielectric material;
  (b) a coated electrode cross-sectional diameter of 0.02–0.3″; and
  (c) a tip at one end open to the hollow interior of the electrode, the tip being uncoated on that portion which faces the workpiece surface;

passing an aqueous sulfuric acid electrolyte through the electrode and from the tip toward and in contact with the workpiece surface;

passing a predominantly direct electrical current between the electrode and the workpiece with the electrode being cathodic with respect to the workpiece; and then moving the workpiece and electrode one toward the other at a rate of at least 1″ per hour to remove material from the workpiece across a gap between the workpiece and the electrode tip to produce a cavity having walls in spaced relationship with the coated outer surface of the electrode, the gap being controlled to provide unrestricted, low pressure flow of electrolyte from the tip through the cavity produced by
  (a) maintaining the electrolyte flow capacity through the gap and into the cavity produced at no greater than equal to the electrolyte flow capacity of the space between the walls of the cavity and the coated outer surface of the electrode, while
  (b) maintaining the electrolyte pressure at between 5–35 p.s.i.g., and
  (c) adjusting the power input within the range of about 0.8–5 amps and about 4–13 volts to avoid high velocity and high pressure of the electrolyte leaving the gap between the electrode tip and the workpiece and cavitation and erratic movement at the tip of the electrode.
2. The method of claim 1 in which:
the hollow electrode is tubular;
the workpiece is a nickel base superalloy;
the coated electrode cross-sectional diameter is 0.02–0.20″; and
the movement of the electrode and the workpiece one toward the other is at a rate of 1–6″ per hour.
3. The method of claim 2 in which:
the movement of the electrode and workpiece one toward the other is at a rate of 1–3″ per hour; and
the electrolyte pressure is maintained at 5–30 p.s.i.g.

References Cited

UNITED STATES PATENTS

| 2,739,935 | 3/1956 | Kehl | 204—143 |
| 2,905,605 | 9/1959 | Keeleric | 204—143 |
| 3,058,895 | 11/1962 | Williams | 204—143 |

FOREIGN PATENTS

| 335,003 | 9/1930 | Great Britain. |
| 761,795 | 11/1956 | Great Britain. |

JOHN H. MACK, *Primary Examiner.*

ROBERT K. MIHALEK, *Examiner.*